B. H. WESSEL.
Thill-Couplings.
No. 146,419. Patented Jan. 13, 1874.
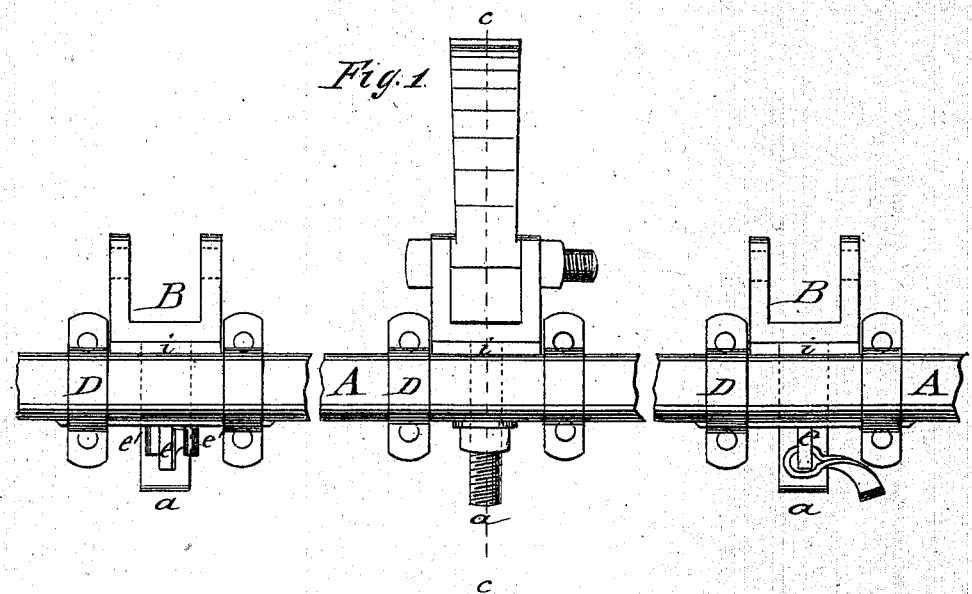
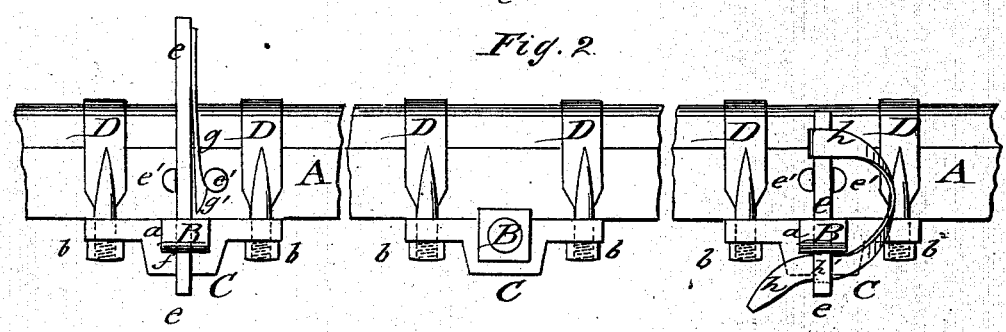
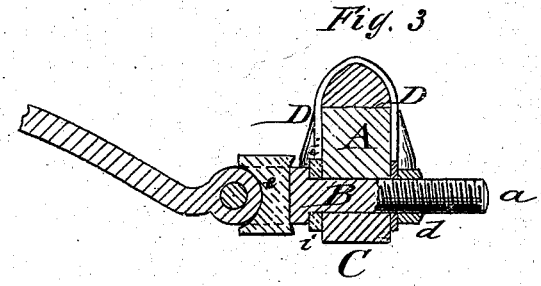
Witnesses:
E. Wolff.
Sedgwick
Inventor:
B. H. Wessel.
Per
Attorneys.

UNITED STATES PATENT OFFICE.

BERNARD H. WESSEL, OF CINCINNATI, OHIO, ASSIGNOR TO HIMSELF AND GEORGE R. GROOT, OF SAME PLACE.

IMPROVEMENT IN THILL-COUPLINGS.

Specification forming part of Letters Patent No. 146,419, dated January 13, 1874; application filed September 13, 1873.

*To all whom it may concern:*

Be it known that I, BERNARD H. WESSEL, of Cincinnati, in the county of Hamilton and State of Ohio, have invented a new and Improved Coupling for Carriage Shafts and Pole, of which the following is a specification:

In the accompanying drawing, Figure 1 represents a bottom view of my improved coupling for carriage shafts and poles, showing three modifications of applying it to the axle. Fig. 2 is a rear view, and Fig. 3 is a vertical transverse section of the same, on the line $c\ c$, Fig. 1.

Similar letters of reference indicate corresponding parts.

The object of my invention is to facilitate the changing of the shafts of a carriage to pole, and vice versa, with as little loss of time and labor as possible, and preventing accidents or rattling of the parts. My invention consists of a coupling which is attached to the shafts or pole and applied directly through the axle or by means of clips and clip-plate, and held thereon by a screw, wedge, or other equivalent, together with a rubber cushion. The invention consists in changing the shackle or coupling at the axle, instead of removing the bolt (as is usually done) that passes through the eye of shaft or pole. The latter is done with difficulty, on account of the usual rubber block that presses on the bolt.

The shank $a$ of each coupling B is attached to axle A by a clip-plate, C, and clip D, which are fastened by nuts $b$. The clip-plate and clips may, however, be dispensed with, and the shanks $a$ applied directly to the axle by having mortises cut therein to receive the same.

The coupling B is securely connected to axle A, either by threading the shank end and retaining it by nut and washer $d$, or by using a wedge-key, $e$, which is held by guide-lugs $e'$, and driven through a slot, $f$, of shank $a$. The detaching of wedge $e$ is prevented by a spring, $g$, which is applied to the side of wedge $e$ and locks with its projecting-head, $g'$, over one of the lugs $e'$, or a leather strap, $h$, may be passed through a slot, $h'$, of the wedge-piece, or any other equivalent device may be used. A rubber plate, $i$, is placed on the shank $a$ between the shoulders of the coupling and the axle to prevent the annoying rattling of the parts, and produce a constant pressure on the key or nut. The coupling and rubber plate $i$ remain permanently attached to the shafts or pole, and is detached from the axle by simply removing the key or nut on the back part of the shank. The difficulty of removing the usual cross-bolt, which is caused by the pressure of the rubber block or cushion against the same, is thereby avoided. The coupling device may also easily be attached to any axle, the shafts and poles being connected with greater ease and facility.

Having thus described my invention, I claim as new and desire to secure by Letters Patent—

The coupling-iron B, having the shank $a$ and the bearing-block $e$, combined with the axle A and the clip D, substantially as and for the purpose described.

BERNARD H. WESSEL.

Witnesses:
CHAS. R. WITHERUP,
W. J. GOSLING.